United States Patent [19]

Pavlak, Jr. et al.

[11] Patent Number: 4,736,116
[45] Date of Patent: Apr. 5, 1988

[54] POWER-UP SEQUENCING APPARATUS

[75] Inventors: Raymond Pavlak, Jr., Westboro, Mass.; Robert W. George, II, Windham, N.H.

[73] Assignee: Denning Mobile Robotics, Inc., Woburn, Mass.

[21] Appl. No.: 864,590

[22] Filed: May 16, 1986

[51] Int. Cl.⁴ .......................................... H02J 13/00
[52] U.S. Cl. .......................................... 307/41; 307/9; 307/35; 307/38; 363/49; 323/901
[58] Field of Search .................. 307/34, 35, 37, 38, 307/39, 40, 41, 112, 113, 114, 115, 130, 131, 140, 141, 239, 240, 241, 242, 243, 244, 246, 248, 249, 250, 270, 300, 315, 570, 573, 592; 328/69, 70, 71, 73, 75, 77, 83, 97; 363/49; 323/901; 901/49, 50

[56] References Cited

U.S. PATENT DOCUMENTS

| | | | |
|---|---|---|---|
| 3,305,726 | 2/1967 | Goodman et al. | 307/242 X |
| 3,651,335 | 3/1972 | Shimizu et al. | 328/75 |
| 3,725,675 | 4/1973 | Olson | 307/248 X |
| 3,826,970 | 7/1974 | Oka et al. | 307/39 |
| 4,274,503 | 6/1981 | Mackintosh | 180/23 |
| 4,441,031 | 4/1984 | Moriya et al. | 307/66 |
| 4,463,821 | 8/1984 | Falamak | 180/23 X |
| 4,500,970 | 2/1985 | Daemmer | 318/587 X |

*Primary Examiner*—William M. Shoop, Jr.
*Assistant Examiner*—Shik Luen Paul Ip
*Attorney, Agent, or Firm*—Joseph S. Iandiorio; Douglas E. Denninger

[57] ABSTRACT

A power-up sequencing apparatus for successively energizing a plurality of associated subsystems in a host system, including a series of interconnected sequencing circuits, each sequencing circuit interconnected with a subsystem and including first switching means responsive to an initial system power-up for disabling its associated subsystem; second switching means responsive to an initial system power-up for suppressing the start command to the next sequencing circuit in the series; and third switching means responsive to a start command for operating the first switching means to enable its associated subsystem and for operating the second switching means to introduce a start command to the next sequencing circuit in the series.

4 Claims, 7 Drawing Sheets

POWER-UP SEQUENCING APPARATUS

FIELD OF INVENTION

This invention relates to a power-up sequencing apparatus for succesively energizing a plurality of associated subsystems in a host system, and more particularly to such an apparatus for use in a vehicle such as a mobile robot.

CROSS-REFERENCE

The following applications, filed concurrently herewith, are incorporated herein by reference:

| Inventors | Title | Attorney's Docket No. |
| --- | --- | --- |
| Maddox et al. | Intrusion Detection System | DMR-101J |
| Muller et al. | Ultrasonic Ranging System | DMR-102J |
| Benayad-Cherif et al. | Position Locating System for Vehicle | DMR-103J |
| Maddox et al. | Beacon Proximity Detection System for Vehicle | DMR-105J |
| Kadonoff et al. | Orientation Adjustment System and Robot Using Same | DMR-106J |
| Kadonoff et al. | Obstacle Avoidance System | DMR-107J |
| Kadonoff et al. | Beacon Navigation System and Method for Guiding a Vehicle | DMR-108J |
| George II et al. | Recharge Docking System for Mobile Robot | DMR-110J |

BACKGROUND OF INVENTION

Proper power-up sequencing is an ever-present problem with computers and complex systems. If subordinate systems are energized before controller systems the unsupervised subordinate systems may respond to false signals and injure themselves or other components or cause control loop errors or even endanger personnel. In autonomous mobile robots, if the drive motor amplifier is energized before the motor controller, the drive motor amplifier will not be supervised and may see noise which it interprets as a drive command. The robot may as a result dash off at high speed, in any direction, completely uncontrolled. The steering motor for the wheels must be under control before the drive motor can be activated or a moving robot without steering will be loosed. With certain amplifiers the bias must arrive close to the power or the amplifier may destroy itself. If subordinate systems power-up before control systems, then the subordinate systems may be actively, wastefully, dangerously executing false commands. Servo-control loop errors can lock up the robot when it tries to achieve unrealistic goals set by the false commands, to the extent that the robot shuts down and skilled personnel have to become involved to remedy the situation.

One approach to the problem is to simply build time delays into each different piece of equipment so that each turns on at a predetermined time. One problem with this approach is that the arrival of the time gate for turning on any particular component does not assure that previous windows arrived on time and that power was indeed supplied to the attendant equipment.

SUMMARY OF INVENTION

It is therefore an object of this invention to provide an improved power-up sequencing apparatus for temporally spacing the turning on of related subsystems.

It is a further object of this invention to provide such a power-up sequencing apparatus which accurately and reliably controls the timed energizing of related subsystems.

It is a further object of this invention to provide such a power-up sequencing apparatus which cannot turn on the next subsystem in the series unless the previous subsystem has been first turned on.

It is a further object of this invention to provide such a power-up sequencing apparatus for use in a mobile robot or other vehicle.

This invention results from the realization that a truly effective power-up sequencing of related subsystems can be effected with a series of switching circuits, one associated with each subsystem, which responds to a start command after a short delay by passing on the start command but only when its own subsystem has been energized.

This invention features a power-up sequencing apparatus for successively energizing a plurality of associated subsystems in a host system. There is a series of interconnected sequencing circuits, each sequencing circuit being interconnected with a subsystem. Each sequencing circuit includes first switching means responsive to an initial system power-up for disabling its associated subsystem; second switching means responsive to an initial system power-up for suppressing the start command to the next sequencing circuit in the series; and third switching means responsive to a start command for operating the first switching means to enable its associated subsystem and for operating the second switching means to introduce a start command to the next sequencing circuit in the series.

In a preferred embodiment there are time delay means for delaying arrival of the start command at the third switching means.

In addition, the entire power-up sequencing system may be used in a vehicle such as a mobile robot having drive wheels, a drive motor, a steering motor and control modules for operating the motors.

DISCLOSURE OF PREFERRED EMBODIMENT

Other objects, features and advantages will occur from the following description of a preferred embodiment and the accompanying drawings, in which.

Figure 1:
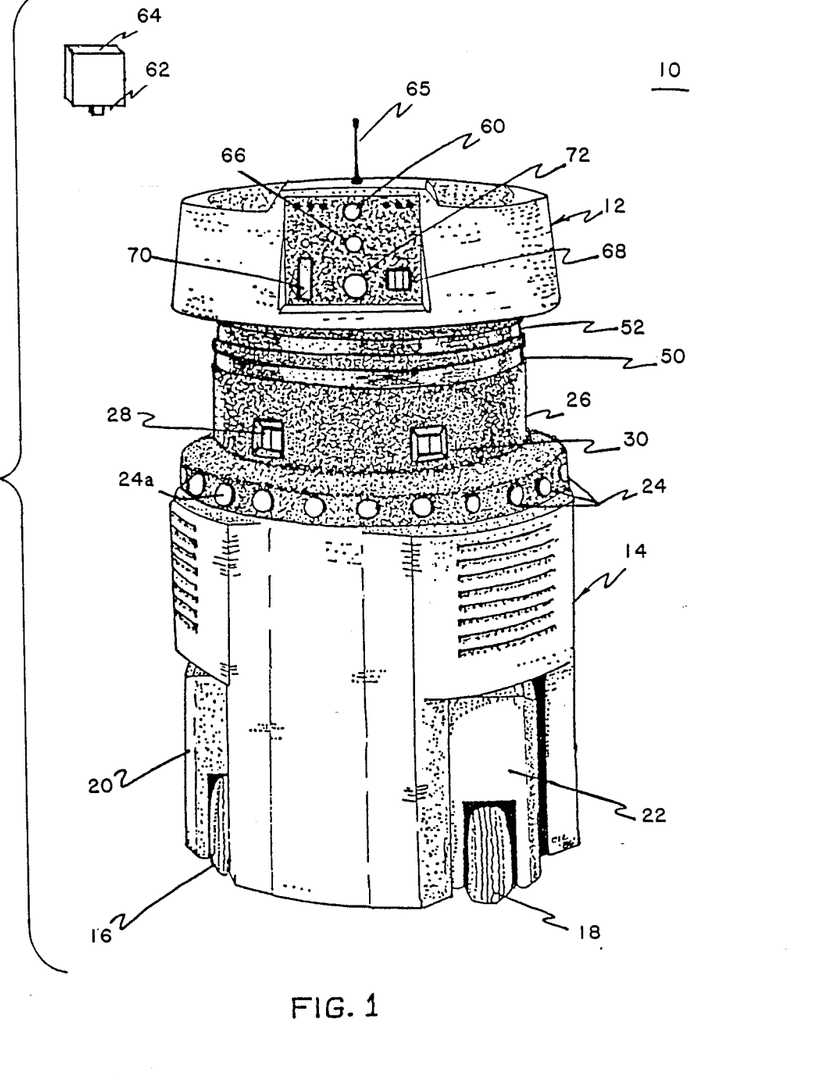
FIG. 1 is an axonometric view of a robot incorporating the power-up sequencing apparatus according to this invention.

There is shown in FIG. 1 a vehicle, robot 10, according to this invention including a head section 12 and a base 14 movable on three wheels, only two of which, 16, 18, are visible. The wheels are mounted in three steerable trucks, only two of which, 20 and 22, are visible. There are twenty-four ultrasonic transducers such as the electrostatic transducer of the Sell type available from Polaroid equally spaced at fifteen degrees around the periphery of base 14. Above that on reduced neck 26 there are located six passive infrared motion detectors 28, 30, 32, 34, 36, 38, only two of which, 28 and 30, are shown. These detectors are equally spaced at sixty degrees apart and may be DR-321's available from Aritech. Just above that are two conductor bands 50 and 52 which are used to engage a charging arm for recharging the robot's batteries. Head section 12 is mounted to base 14 and rotates with respect to base 14 about a central vertical axis. Head section 12 carries an RF antenna 65 for sending and receiving communication signals to a base location or guard station. Head section 12 also includes an infrared sensor 68 for sensing radiation in the near infrared region, e.g., 904 nanometers, such as emitted from LED 62 of beacon 64, one or more of which are mounted on the walls in the space to be protected by robot 10 to assist in locating and directing robot 10 in the area in which it is to patrol. An ultrasonic transducer 66 similar to the transducer 24 used for maneuvering and avoidance may be provided for ranging. There is also provided a passive infrared sensor 68 similar to sensors 28-38. A microwave transmission and reception antenna 70 and a TV camera 72 which may be turned on when an apparent intrusion has occurred are also included in head 12.

Figure 2:
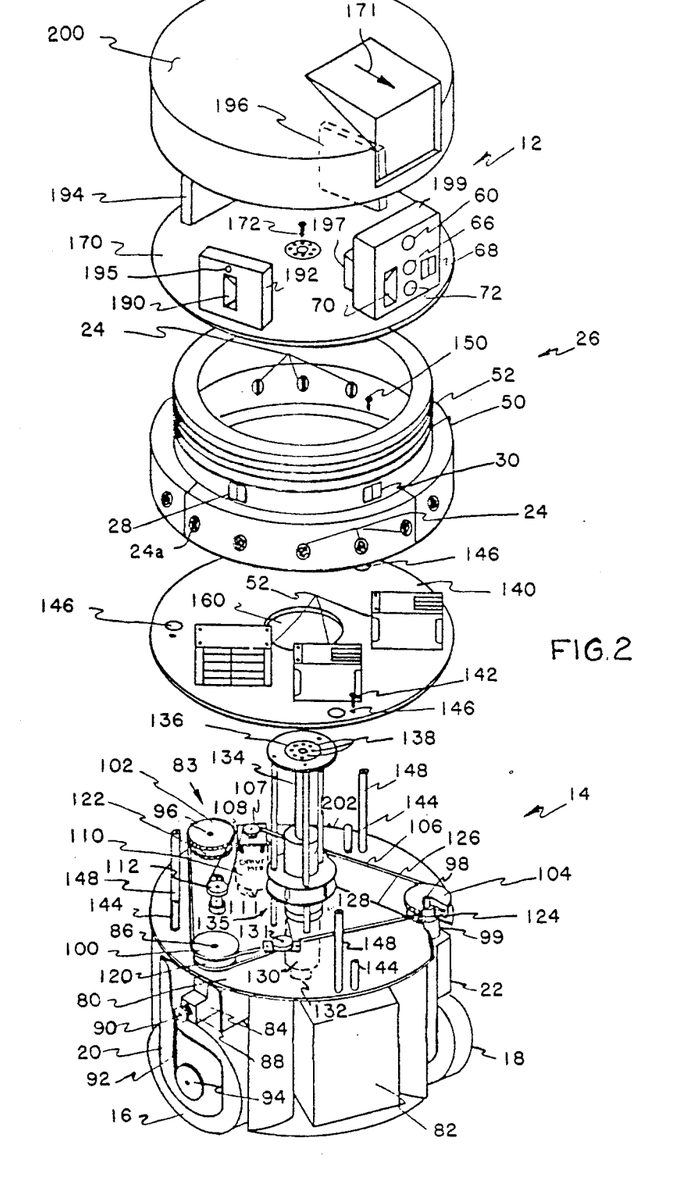
FIG. 2 is a simplified exploded view with parts removed of the robot of FIG. 1.

Base 14, FIG. 2, includes a main chassis 80 which carries three batteries 82 such as Globe 12 V, 80 AH Gel cells, only one of which is shown. When fully charged they will operate the robot for twelve hours or more. Trucks 20 and 22, with wheels 16 and 18 respectively, are suspended from chassis 80. Each truck as indicated at truck 20 includes a right-angle drive 84 which receives input from vertical drive shaft 86 and provides output on horizontal drive shaft 88, which operates pulley or sprocket 90, which in turn through belt 92 drives pulley 94 attached to the axle of wheel 16. Vertical drive shaft 86 and counterpart drive shafts 96 and 98 are driven by their respective sprockets or pulleys 100, 102, 104 which in turn are driven by endless belt 106 powered by the pulley 107 on output shaft 108 of drive motor 110 mounted beneath chassis 80. An encoder 111 mounted with motor 110 monitors the velocity of the robot. An idler wheel 112 is provided to maintain proper tension on belt 106. Three additional shafts, only one of which, 99, is shown, concentric with shafts 86, 96 and 98, respectively, are driven by a second set of pulleys or sprockets 120, 122, 124 engaged with drive belt 126 powered by sprocket 128 driven by steering motor 130 mounted beneath chassis 80. Idler pulley 131 is used to maintain tension on belt 126. An encoder 132 is associated with steering motor 130 to provide outputs indicative of the steering position. The steering motor shaft is connected through pulley 128 to extension shaft 134, the top of which is provided with a flange 136 with a plurality of mounting holes 138. Electronic chassis 140 is mounted by means of screws 142 on three shorter standoffs 144. Three holes 146 in electronic chassis 140 accommodate the pass-through of longer standoffs 148, which mount neck 26 by means of screws 150. Electronic chassis 140 contains all of the electronic circuit boards and components such as indicated at items 152 that are contained in the base 14, including the power cage described infra.

When an electronic chassis 140 and neck 26 are mounted on their respective standoffs, extension shaft 134 and flange 136 and the associated structure are accommodated by the central hole 160 in electronic chassis 140 and the opening in neck 26 so that the head plate 170 may be mounted by means of screws 172 to threaded holes 138 in flange 136. In this way the entire head rotates in synchronism with the trucks and wheels as they are steered by steering motor 130. In addition to the primary microwave sensor 70 there are three additional microwave sensors 190, 330, 332, only one of which, 190, is visible spaced at ninety degrees about head plate 170 mounted in housings 192, 194, and 196. Housing 194 which faces directly to the back of the head as opposed to primary microwave sensor 70 which faces front, also contains a second infrared sensor 334, not visible, which is the same as infrared sensor 68. Cover 200 protects the electronics on head plate 170. All of the electrical interconnections between head 12 and base 14 are made through slip rings contained in slip ring unit 202 mounted about extension shaft 134 in base 14.

Figure 3:
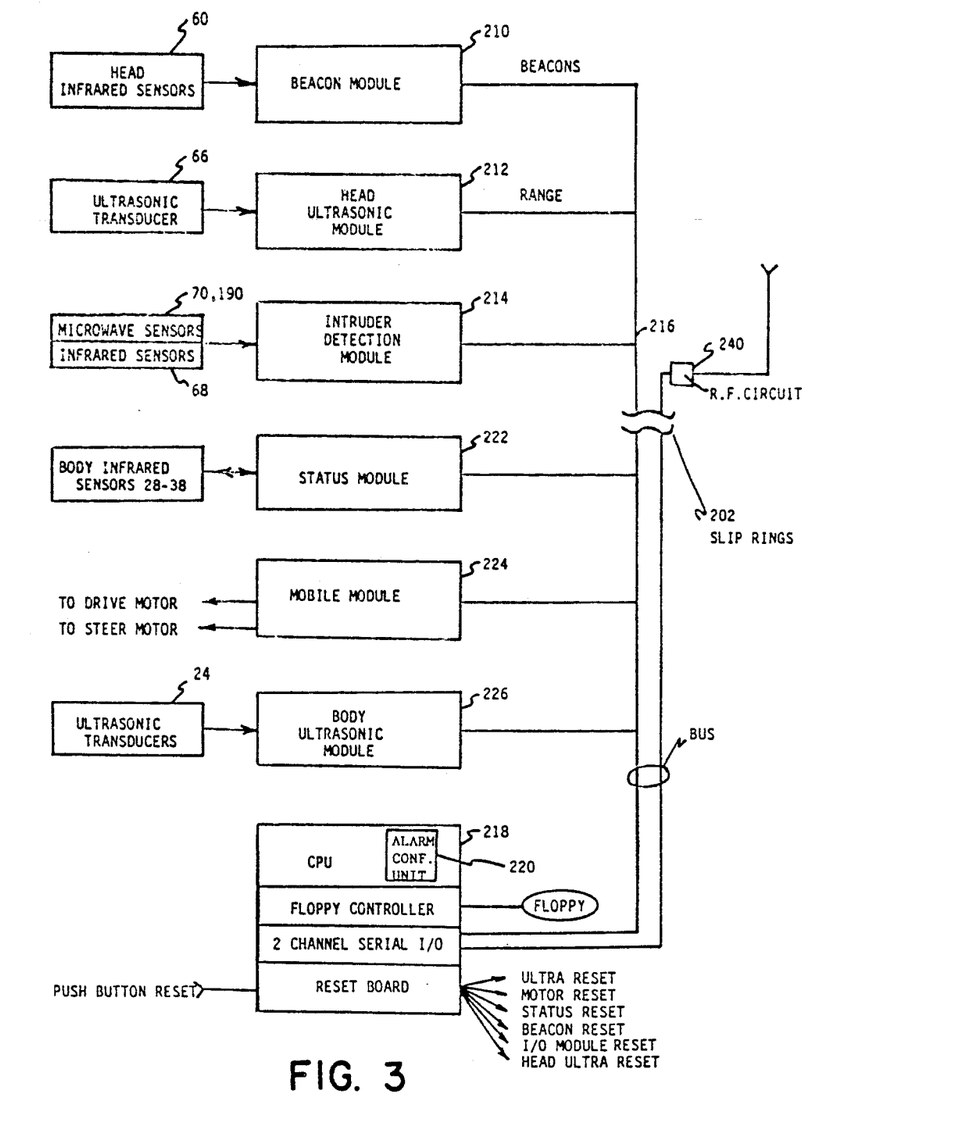
FIG. 3 is a block diagram of the electronic modules included in the robot of FIGS. 1 and 2.

There are a number of subsystems in the robot. Head 12, FIG. 3, includes three electronic portions: beacon module 210, head ultrasonic module 212, and intrusion detection module 214. Beacon module 210 responds to the head IR sensor 60 to determine what angle the beacon 64 is with respect to the robot. That angle is fed on bus 216 through the slip ring unit 202 to the main CPU 218. Head ultrasonic module 212 responds to ultrasonic transducer 66 to provide ranging information on bus 216 to CPU 218. Intruder detection module 214 responds to the four microwave sensors 70, 190, 330, 332, and the two IR sensors 68, 334 to provide indications as of yet unconfirmed intrusion events. These events are processed by the alarm confirmation unit 220 in CPU 218 to determine whether a true confirmed intrusion has occurred. In the body section 14, there is included status module 222, mobile module 224, body ultrasonics module 226, power cage 227, and CPU 218. Status module 222 responds to the six infrared sensors 28-38 to provide an indication of an intrusion. Status module 222 may also monitor fire and smoke detectors, diagnostic sensors throughout the robot, as well as chemical and odor detectors and other similar sensors. Mobile module 224 operates and monitors the action of drive motor 110 and steering motor 130. The twenty-four ultrasonic transducers 24 provide an input to the body of ultrasonic module 226, which guides the movement and obstacle avoidance procedures for the robot. Power cage 227 draws on the batteries and controls the sequencing of power to the subsystems. Finally, body 14 contains CPU 218, which in addition to the alarm confirmation unit 220 also interconnects with a floppy disk controller, two-channel serial I/O boards, and a reset board which receives inputs from a pushbutton reset and CPU218 and outputs ultrasonic resets, motor resets, status resets, beacon resets, I/O module resets and head ultrasonic resets. CPU 218 also sends and receives communication using RF antenna 65 and RF circuit 240.

Figure 4A:
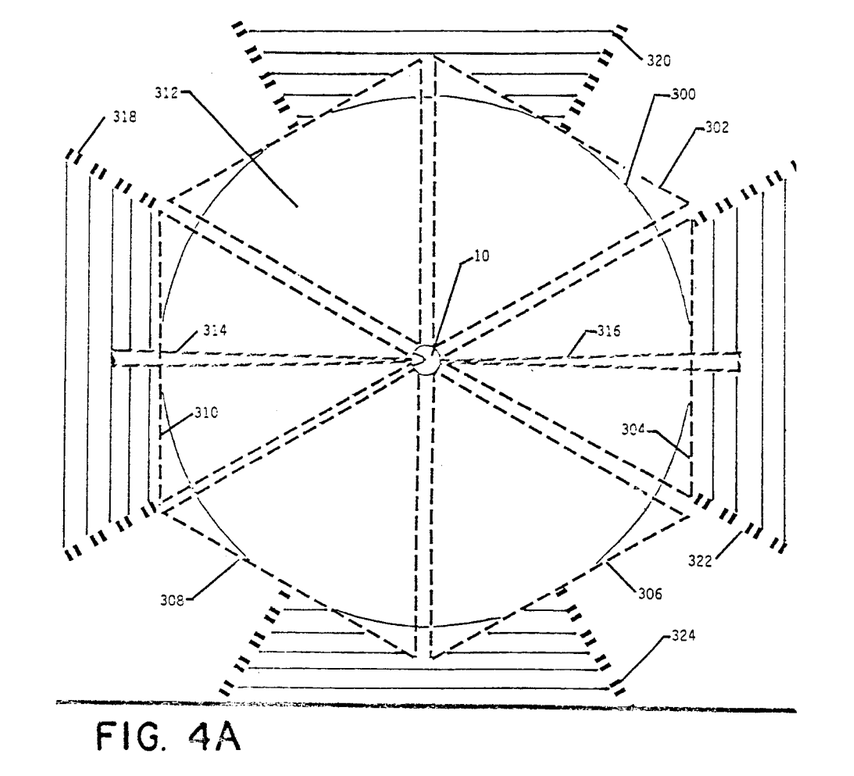
FIG. 4A is a plan view of the fields of view of the ultrasonic, infrared, and microwave sensors of the robot of FIG. 1.
Figure 4B:
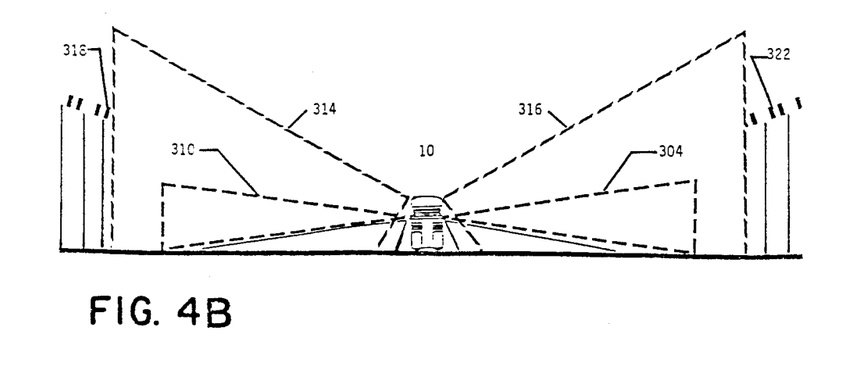
FIG. 4B is a side elevational view taken along line 4B—4B of FIG. 4A, showing the vertical profile of the fields of view.

A top plan view of the fields of view of the various sensors and transducers is shown in FIG. 4A. The twenty-four ultrasonic transducers 24 have a complete 360° field of view 300. The six infrared sensors 28, 30, 32, 34, 36, 38, on body 14 provide six triangular fields of view 302, 304, 306, 308, 310 and 312. The two infrared sensors 68 and 334 on head 12 provide the narrower fields of view 314 and 316, and the four microwave transducers 70, 190, 330, 332 provide the four fields of view 318, 320, 322 and 324. The vertical profile of these fields is depicted in FIG. 4B. The field of view of the microwave transducers extends approximately one hundred fifty feet. That of the infrareds in the head extend about thirty feet, those of the infrared in the body about five feet, and the ultrasonics in the body also extend about twenty-five feet.

Figure 5A:
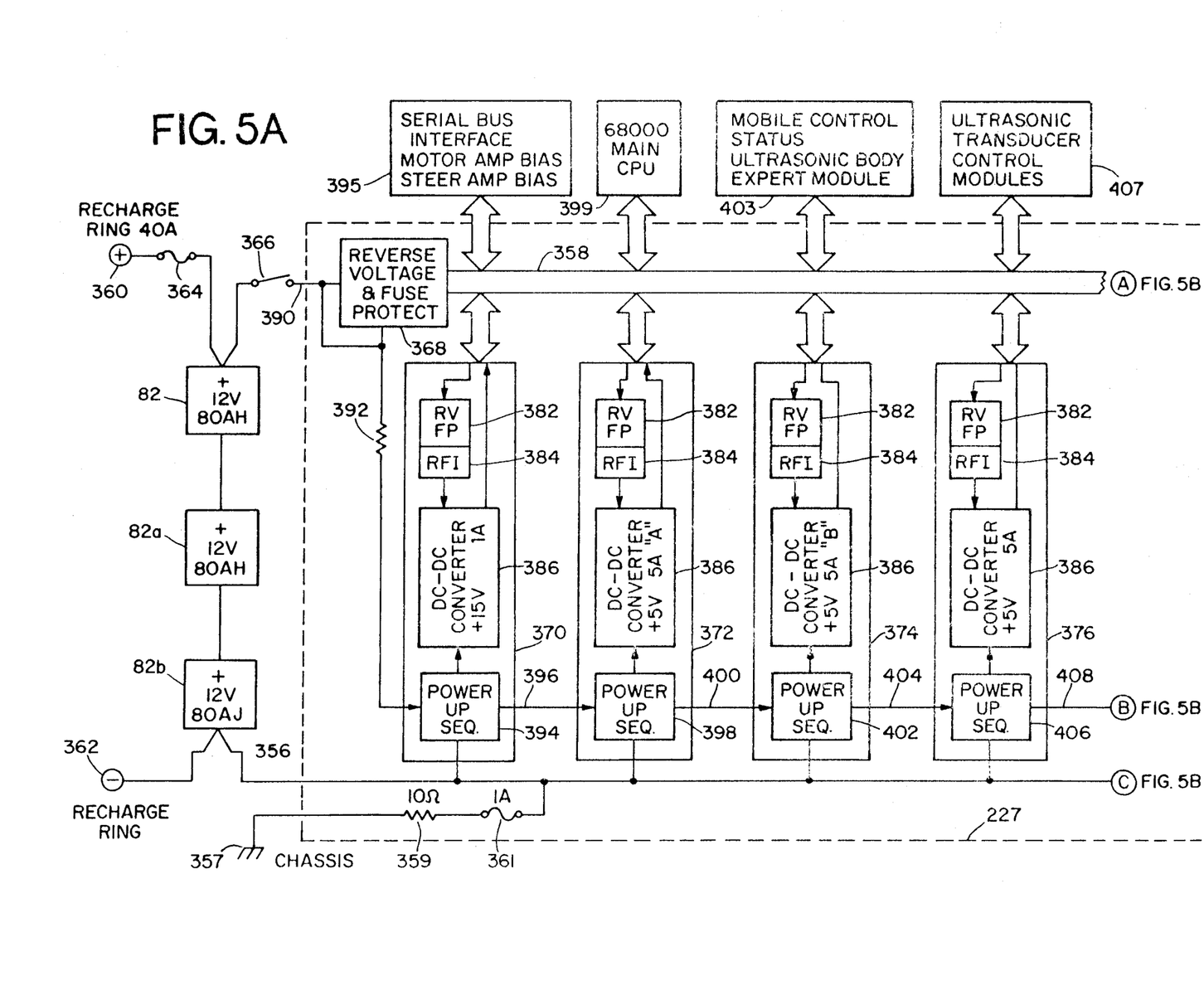
FIG. 5 is a block diagram of the power-up sequencing apparatus according to this invention.
Figure 5B:
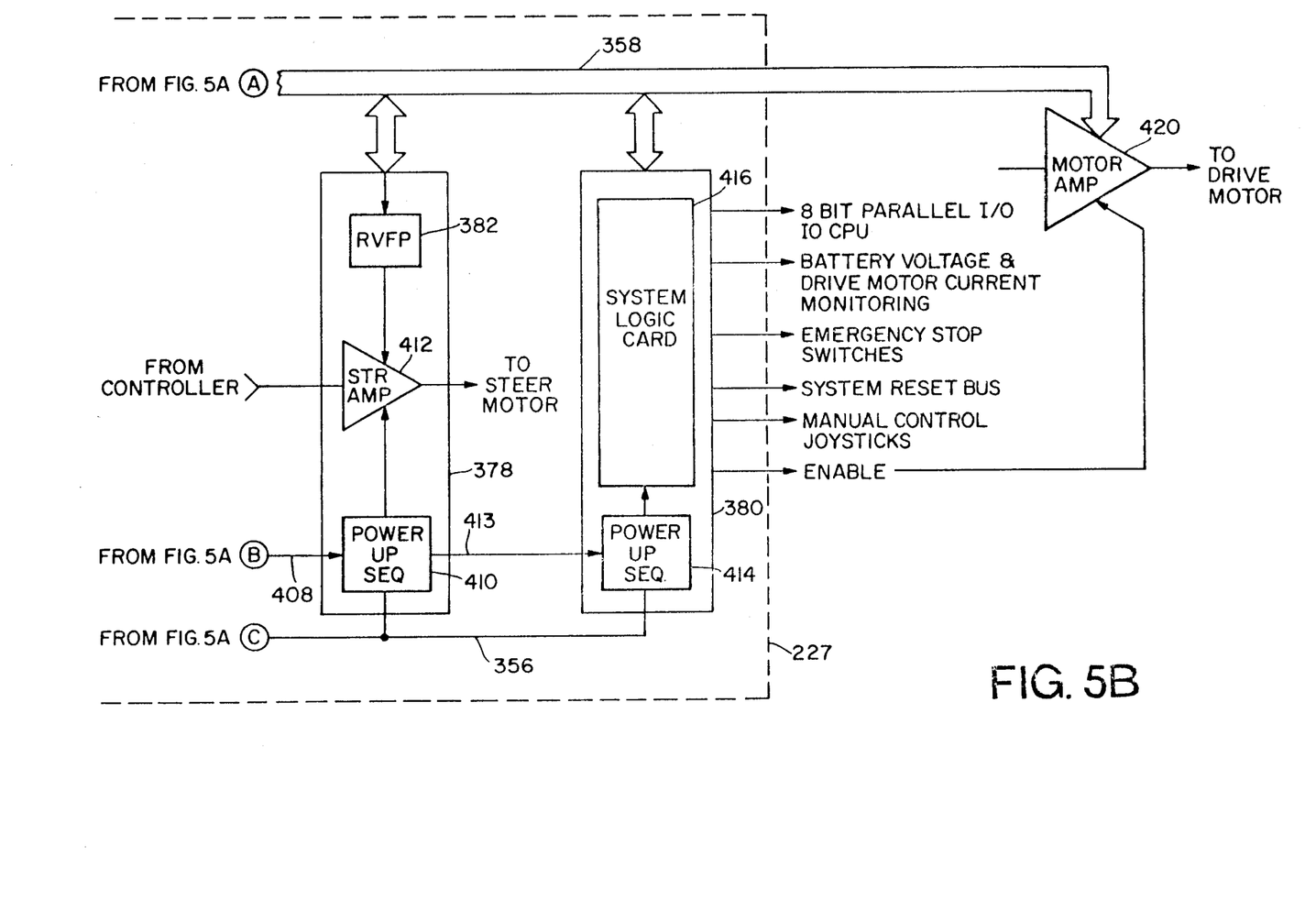

The power-up sequencing apparatus of this invention is included in power cage 227, FIG. 5, for which the primary source is three batteries 82, 82a and 82b, typically 12-volt, 80 amp-hour storage batteries which are connected in series between the negative bus 356 interconnected with chassis ground 357 through resistor 359 and one-amp fuse 361, and with the positive bus 358. The batteries are charged through re-charge contacts 360, 362 and fuse 364. Switch 366, when closed, provides twelve, twenty-four and thirty-six volts to main bus 358 through reverse voltage and fuse protection circuit 368. Power cage 227 includes six power units 370, 372, 374, 376, 378, and 380.

Each of power units 370–378 includes a reverse voltage and fuse protection circuit 382. In addition, power units 370–376 include RF filters 384. Each of power units 370–376 also includes a DC to DC converter 386, each of which provides a d.c. output to its associated subsystems.

When the system is initialized by the closing of switch 366, thirty-six volts on line 390 are delivered through 10K resistor 392 to power-up sequencing circuit 394 in power unit 370. After a short period of time power-up sequencing circuit 394 energizes its associated converter 386, which supplies power to the serial bus interface, the motor amplifier bias, and the steering amplifier bias, block 395. After that occurs a start command is sent on line 396 to power-up sequencing circuit 398, which after a short period of time energizes its associated DC to DC converter 386, which powers up the main CPU 218, block 399. After this, a start command is sent on line 400 to power-up sequencing circuit 402, which then energizes its associated converter 386. This converter powers up the mobile module 224, the status module 222 and the body ultrasonic module 226, block 403. After converter 386 is energized, a start command is sent on 404 to power-up sequencing circuit 406, which in turn energizes its associated converter 386 to provide power to the body transducer control modules, block 407. Following energization of its associated converter, power sequencing circuit 406 sends a start command on line 408 to power sequencing circuit 410, which immediately enables steering amplifier 412 since the bias has been previously supplied as indicated in block 395, so that amplifier 412 now provides an output from its controller, mobile module 224, to the steering motor. After this, power-up sequencing circuit 410 provides a start command on line 413, which causes power-up sequencing circuit 414 to energize the system logic card 416. This provides the final initialization of the circuit by sending signals, for example, to an eight-bit parallel input/output device to the microprocessor in module 224, the battery voltage and drive motor current monitoring system, the emergency stop switches, the system reset bus, the manual control joysticks, and finally an enable signal to the motor amplifier 420, which has previously been provided with a bias on bus 358 as indicated in block 395, so that the robot is now able to move. Should any one of the subsystems not be powered up, its associated power-up sequencing circuit would not propagate the start command and the following units would not be energized.

The power-up sequencing achieves orderly initialization. The serial bus interface is turned on first so that the various modules 210, 212, 214, 222, 224, 226 can talk to each other. The motor amplifier bias and the steering amplifier bias are turned on at this early stage to prevent damage to the amplifiers and also to eliminate motor control loop errors. In the next stage, block 399, the main computer is turned on since it is the top of the hierarchy and the highest command source, and once it is on, spurious commands will be prevented from misleading the subordinate units. Next, in block 403 the mobile module is turned on along with the status module and the ultrasonic body module as they are subordinate to the CPU and are now safely energized. In the fourth stage, block 407, transducer control modules are then energized. In the fifth stage the steering power amplifier is energized. This must be done before the drive motor amplifier is turned on. Finally the system logic card is powered up to enable various monitoring systems, diagnostics and the like, and to finally enable the drive motor amplifier so that the robot now has motive power.

Figure 6:
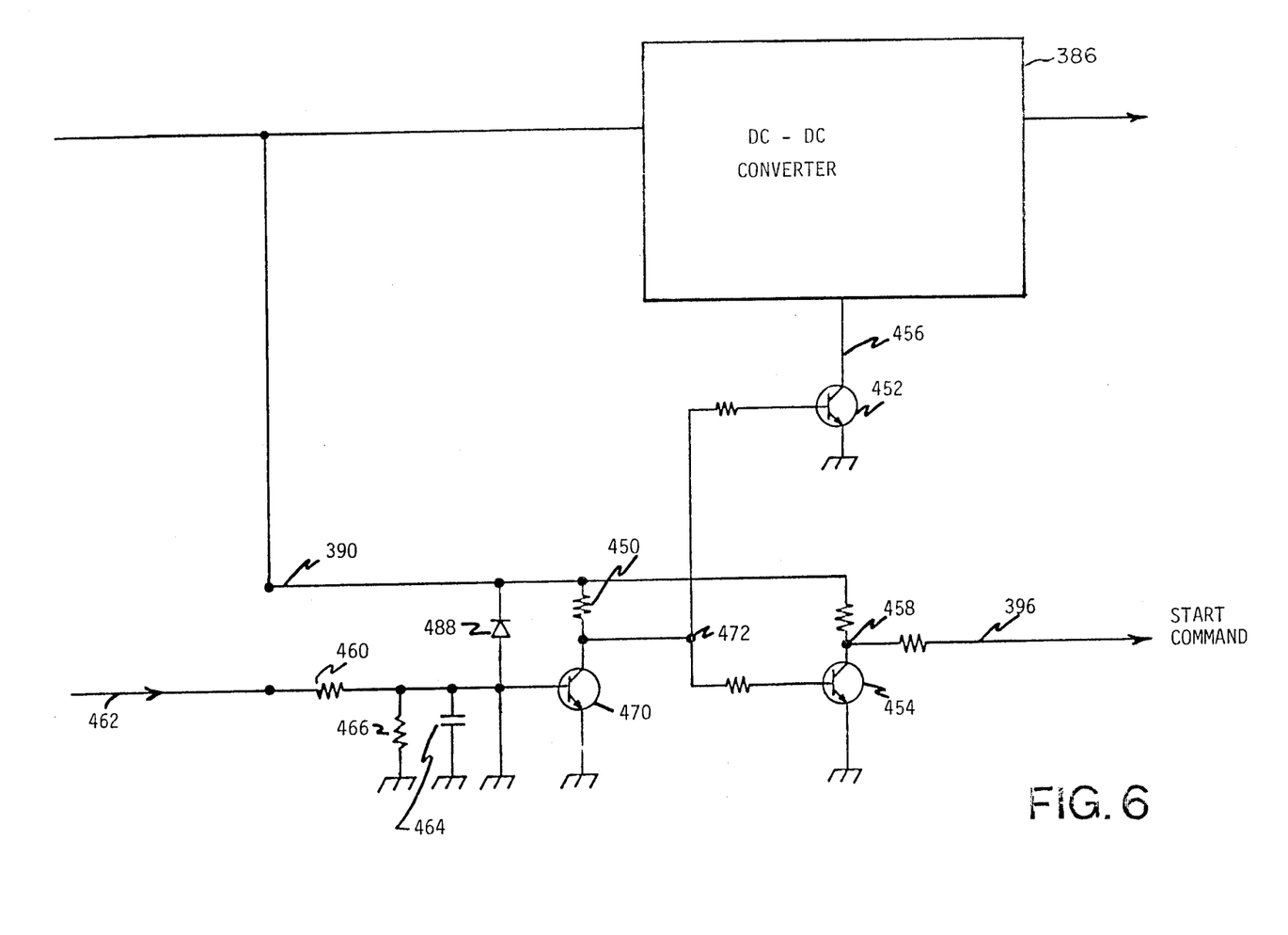
FIG. 6 is a more detailed circuit schematic of a power-up sequencing circuit of FIG. 5.

Each power-up sequencing circuit is constructed as indicated with respect to circuit 394 as shown in FIG. 6. When switch 366, FIG. 5, is closed, thirty-six volts are applied to line 390 and through resistor 392 and resistor 460 to the base of transistor 470. Capacitor 464, discharged, holds transistor 470 off, and point 472 is now free to bias transistors 452, 454 on. When transistor 452 conducts it connects line 456 to ground, thereby inhibiting the operation of DC converter 386. When transistor 454 conducts, it brings point 458 to ground and thereby suppresses the start command on line 396 to the next power-up sequencing circuit 398. However, when the start command arrives on line 462 it immediately begins to charge capacitor 464 through resistors 460. Resistors 466 and diode 488 are provided for discharge of capacitor 464 when the system is turned off. At this point, when capacitor 464 charges sufficiently it provides a bias on the base of transistor 470, which causes it to conduct. When it conducts it draws point 472 to ground and thereby shuts off both transistors 452 and 454. Thus simultaneously the signal on line 456 is allowed to rise so that DC converter 386 is no longer inhibited from operation, and point 458 also rises to generate the start command to the next power sequencing circuit in series, in this case circuit 398. In each subsequent circuit there is no input from resistor 392; there is only a start command generated by the previous power-up sequencing circuit.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A power-up sequencing apparatus for successively energizing a plurality of associated subsystems in a host system, comprising:
   a series of interconnected sequencing circuits, each said sequencing circuit interconnected with a subsystem and including:
   first switching means, responsive to an initial system power-up, for disabling its associated subsystem;
   second switching means, responsive to an initial system power-up, for suppressing the start command to the next sequencing circuit in the series; and third switching means, responsive to a start command, for operating said first switching means to enable its associated subsystem and for operating said second switching means to introduce a start command to the next sequencing circuit in the series.

2. The power-up sequencing apparatus of claim 1 further including time delay means for delaying arrival of said start command at said third switching means.

3. In a vehicle having drive wheels, a drive motor, a steering motor and control modules for operating said motors, a power-up sequencing apparatus for successively energizing a plurality of associated subsystems in a host system, comprising:

a series of interconnected sequencing circuits, each said sequencing circuit interconnected with a subsystem and including:
first switching means, responsive to an initial system power-up, for disabling its associated subsystem;
second switching means, responsive to an initial system power-up, for suppressing the start command to the next sequencing circuit in the series; and
third switching means, responsive to a start command, for operating said first switching means to enable its associated subsystem and for operating said second switching means to introduce a start command to the next sequencing circuit in the series.

4. The power-up sequencing apparatus of claim 3 further including time delay means for delaying arrival of said start command at said third switching means.

* * * * *